United States Patent [19]

Serur

[11] 4,328,820

[45] May 11, 1982

[54] CONSTANT-FLOW REGULATOR FOR GRAVITY-FED LIQUIDS

[76] Inventor: Juan R. Serur, 546 Commonwealth Ave., Newton Center, Mass. 02159

[21] Appl. No.: 199,075

[22] Filed: Oct. 20, 1980

[51] Int. Cl.³ .................... F16K 21/18; G05D 7/01
[52] U.S. Cl. ................... 137/2; 128/214 C; 116/273; 116/277; 137/391; 137/433; 137/553; 138/45; 222/68; 251/122; 251/205
[58] Field of Search ............. 137/391, 426, 430, 433, 137/8, 9, 2, 551, 553; 128/214 R, 214 C, 214.2, 274; 251/205, 118, 121, 122; 138/45; 116/273, 277; 222/65, 67, 68

[56] References Cited

U.S. PATENT DOCUMENTS

| | | | |
|---|---|---|---|
| 2,602,464 | 7/1952 | Greening | 137/391 |
| 3,667,464 | 6/1972 | Alligood, Jr. | 137/433 |
| 3,929,157 | 12/1975 | Serur | 128/214 C |
| 3,989,043 | 11/1976 | Dimeff | 128/214 C |
| 4,096,879 | 6/1978 | Serur et al. | 137/391 |
| 4,269,222 | 5/1981 | Palti | 137/391 |

Primary Examiner—George L. Walton
Attorney, Agent, or Firm—Richard P. Crowley

[57] ABSTRACT

A constant-flow regulator for use in gravity-assisted liquid-delivery systems, wherein the regulator comprises: upper and lower cylindrical elements secured together for movement to form a chamber, whereby the height of the chamber formed by the upper and lower sections may be varied; and a double conical float element positioned within the chamber, the float element moving between a closed and an open position, whereby one or the other end of the float element moves upwardly or downwardly to seal an inlet or an outlet, in order to maintain constant the liquid level within the closed container formed by the first and second cylindrical elements.

11 Claims, 2 Drawing Figures

CONSTANT-FLOW REGULATOR FOR GRAVITY-FED LIQUIDS

BACKGROUND OF THE INVENTION

There are a number of fluid-flow, particularly liquid-flow, regulating devices for the control of the rate of flow of a gravity-fed or gravity-assisted fluid-delivery system. Such flow-control devices and regulators are particularly useful for delivery of liquids, such as intravenous fluids or other fluids, in medical applications. Typical fluid-flow regulators and adjustable fluid-flow regulators are described, for example, in U.S. Pat. No. 3,929,157, issued Dec. 30, 1975, and U.S. Pat. No. 4,096,879, issued June 27, 1978. The devices described therein, while effective, are often quite complicated in structure and require the production of a number of integrally molded parts and the hand-production and hand-assembly of such parts.

For example, the adjustable fluid-flow regulator device of U.S. Pat. No. 4,096,879 comprises a pair of upper and lower chambers, each chamber having a double-acting float valve therein for opening and closing an inlet and an outlet in each chamber, with the chambers being separate and connected by a flexible tube. The flow rate of the regulator device as described is dependent upon the spacing between the fluid level in the upper chamber and the metering orifice and upon the crosssectional size of the metering orifice in the lower chamber fluid inlet. This adjustable flow-regulator device, although useful, is not easily and simply manufactured and is quite complicated in both construction and operation.

SUMMARY OF THE INVENTION

My invention relates to a flow regulator for use in gravity-assisted liquid-delivery systems and to the method of use and more particularly relates to a constant-flow regulator for gravity-fed liquids, which regulator is simple and economical in construction, installation and use.

My flow regulator provides for a constant flow of a fluid, such as a gravity-assisted or gravity-fed liquid, such as intravenous solution or the like, and generally comprises a pair of generally cylindrical elements, each closed at one end and which, together, form a closed fluid container, the elements so positioned so that they are movable in longitudinal length relative to each other, such as by being slidably adjustable or threadably adjustable by maintaining a fluid-tight closed container therein. The pair of cylindrical elements, which form the closed fluid chamber of the container, are adapted to contain a single float-valve element therein, which element has upper and lower closing means, which element moves between open and closed positions.

The chamber has a generally centrally disposed inlet for the introduction of the liquid and a centrally disposed outlet for the withdrawal of the delivery of a liquid from the container. The upper element also contains a vent means, so that fluid communication is provided between the interior of the closed fluid container and the atmosphere. The inlet and the outlet are placed generally centrally and opposite each other. The inlet and the outlet and the top and bottom sections of the float are tapered or otherwise contoured such that, when the liquid level within the closed container rises, the top of the float moves upwardly into a closed sealing relationship with the upper inlet, to seal the upper inlet in a fluid-tight manner, and, when the fluid level in the closed container drops, the float moves downwardly into a sealing relationship with the lower outlet, to prevent the withdrawal or delivery of the liquid from the closed fluid container. The rate of flow delivery of the liquid from the fluid container is controlled by the user's adjusting the longitudinal length of the first and second cylindrical sections which make up the chamber. Typically a vernier scale or other measuring means is placed on the exterior surface of one or both elements, so that the user may promptly move the matingly engaged movable first and second cylinders to the desired level for the desired liquid-flow rate.

My flow regulator may be constructed easily and simply from plastic materials and is simple in operation, design and structure. The upper and lower parts of the cylindrical containers may be formed of a transparent or translucent plastic, so that the liquid to be delivered can be measured and the position of the float valve, typically also of plastic and, for example, which may be a closed, hollow generally cylindrical container having tapered or contoured upper and lower sections, may be observed by the user. The longitudinal length of the closed fluid container may be made by a number of means, but typically may be changed by placing the upper and lower elements in a mating and sealing relationship, such as by a threadable relationship, whereby the user may, by turning one or the other element, increase or decrease the longitudinal length of the chamber, if desired, to provide for control flow. My flow-regulator device provides for adjustment of the longitudinal length of the closed fluid container such that the upper and lower sections of the float valve are matingly engaged in both the inlet and the outlet, so that there is no flow, and then the user, merely by adjusting the length, may obtain the desired flow. My flow regulator eliminates the use of separate upper and lower containers and flexible tubing means and the use of a special metering orifice in the lower chamber.

My constant-flow regulator, for use with gravity-fed or gravity-assisted liquid, will be described for the purpose of illustration only in connection with a certain preferred embodiment. However, it is recognized that those persons skilled in the art may make various changes and modifications in the embodiment described, all falling within the spirit and scope of my invention.

DESCRIPTION OF THE EMBODIMENTS

Figure 1:
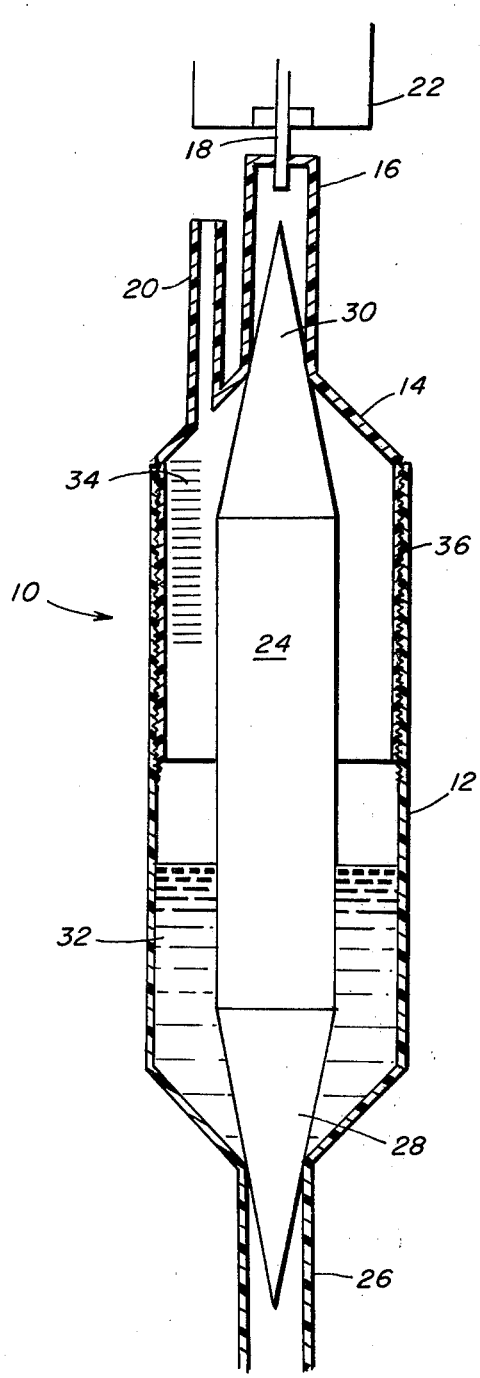
FIG. 1 is a schematic, illustrative, sectional view of my flow regulator in a closed position.
Figure 2:
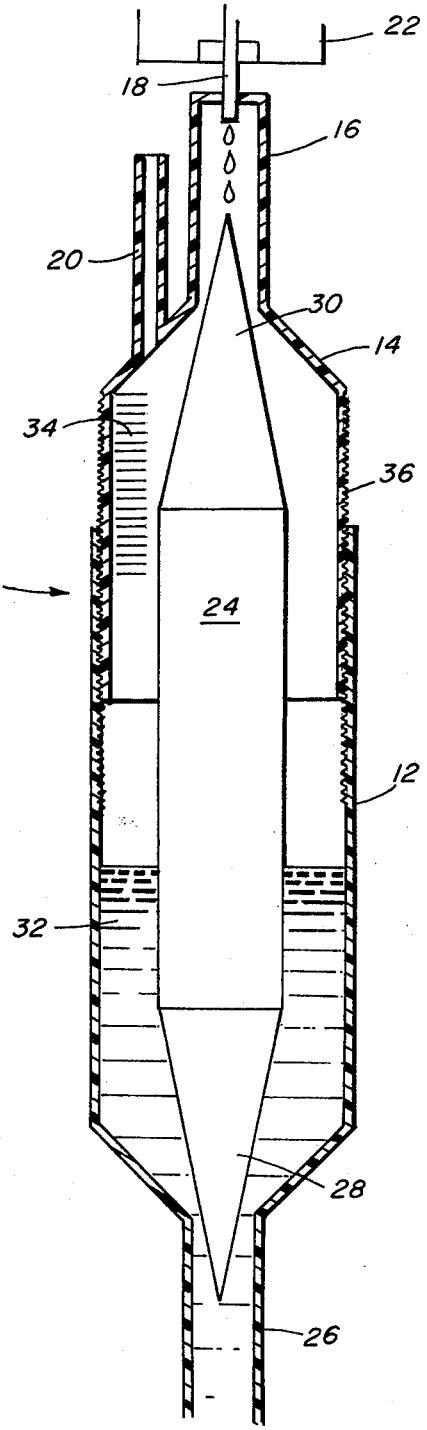
FIG. 2 is a schematic, illustrative, sectional view of my flow regulator in operation, providing a constant flow of liquid from a gravity-fed source.

My flow regulator 10 comprises a closed fluid container made of a transparent, plastic material and comprises an upper, cylindrical container element 14 and a lower container element 12 to form a single chamber, the upper and lower elements 14 and 12 secured together in a fluid-tight manner, the surface of the lower element 12 and the surface of the upper element 14 having threads and being threadably secured together in a liquid-tight manner, so that the longitudinal length of the closed fluid container may be adjusted. The upper element 14 has a centrally disposed inlet tube 16 enclosed at its upper end and has a protruding needle 18 inserted into a gravity-fed liquid-delivery system, such as a intravenous liquid contained in bottle 22.

Typically, the closed fluid container contains therein a hollow float valve 24 of a hard plastic material, having tapered upper 30 and lower 28 conical portions thereon. The lower element 12 contains also a centrally disposed outlet 26 for the delivery of a liquid material 32 from the interior of the closed fluid container. The upper element 14 contains a vernier side scale 34 generally extending the length of the threaded portion of the container and visible to a user of the flow-regulator device. The vernier scale may be calibrated to show the flow rate of the liquid, for example, in milliliters per minute or other volume time units. The upper element 14 also contains a vent tube 20 or means which provides communication between the interior of the closed fluid chamber container and the atmosphere.

The flow regulator may be prepared easily from a hard, rigid-plastic, transparent material. The material is made transparent in nature, so that the vernier scale 34, as illustrated, is optional, and adjustment of the flow rate may be made by empirical use. The upper and lower tapered portions 28 and 30 of float valve 24 are illustrated as conical; however, the upper and lower portions may be tapered or contoured in any manner, as well as the openings of the upper inlet 16 and the lower outlet 26, which may be tapered similarly, so that the float valve may fit in a close, mating, sealing arrangement, on movement of the float valve within the closed fluid container. However, the conical tapered upper and lower portions 28 and 30 and the generally cylindrical opening structure of the inlet and outlet tubes 16 and 26 are preferred, in order to prevent sticking of the float valve and to make quite easy and simple the dislodgement of the float valve on upper and lower movement of the liquid level in the container.

In use, the needle 18 is inserted into a gravity-fed or raised intravenous liquid container 22, with the user dialing the upper element 14 to the desired spot on the vernier scale 34, to provide for the desired control-flow rate; thus, adjusting the longitudinal length of the closed container formed by the lower and upper elements 12 and 14. The float valve 24 is maintained in a precontrolled float position within the closed chamber. However, when too much liquid is introduced into the chamber through needle 18, the liquid-level rise causes the float-valve rise under tapered portion 30 to enter and seal the upper inlet 16, preventing the introduction of further liquid 32, while opening the outlet 26 to a greater extent. When the liquid level resumes its normal position, the float valve moves downwardly and delivery of the liquid 32 into the container through needle 18 is continued. When the liquid 32 level is decreased, then float 24 moves downwardly, so that the tapered section 28 becomes sealingly engaged in outlet 26 to stop the further flow of liquid, until the liquid level in the fluid container is again built up to the desired level and prevents the introduction of air at the end of the fluid from the source 22. As illustrated more particularly in FIG. 1 the user simply may move threadably the upper and lower elements 14 and 12, so that the upper and lower sections 30 and 28 of the float valve 24 sealingly closes both the inlet 16 and the outlet 26, so that no flow is permitted.

As illustrated, my flow regulator may be constructed easily and simply and used and is adapted for rapid adjustment of a constant flow rate through empirical observation of the float valve by a user or by employment of a visual or other scale means on one or both of the containers which form the closed fluid container. My flow-regulator device thus overcomes the deficiencies of prior devices and provides for a simple, yet effective, flow-regulator device.

What I claim is:

1. In a flow-regulator device for use in a gravity-assisted fluid-delivery system, wherein the flow regulator comprises:
   (a) a single closed chamber adapted to contain a liquid which is to be delivered at a controlled rate;
   (b) a vent means in the upper portion of the closed chamber, having a communication between the atmosphere and the interior of the closed chamber;
   (c) a centrally disposed inlet in the upper portion of the closed chamber and an opposite centrally disposed outlet in the lower portion of the closed chamber; and
   (d) a float valve disposed within the closed chamber, said closed chamber having upper and lower sections that are so positioned to seal the float valve against the upper inlet and the lower outlet when the fluid from the gravity-assisted system is not being delivered to the closed chamber, the improvement which comprises:
      (i) the upper and lower sections of the closed chamber being formed by a first, upper, generally cylindrical element and a second, upper, generally similar cylindrical element, the upper and lower elements in a movable, longitudinal relationship, to form a fluid-tight, closed chamber containing said float valve therein, and
      (ii) means to adjust the longitudinal length of said closed chamber formed by the upper and lower elements,
   whereby, on movement of the upper and lower elements relative to each other, the flow rate of the liquid in the closed chamber may be controlled by the movement of the float valve, to maintain a desired liquid level in the closed chamber, said float valve may seal the upper inlet when the liquid level in the closed chamber exceeds the desired liquids level and said float valve may seal the lower outlet when the liquid level in the closed chamber drops below the desired liquid level.

2. The flow regulator of claim 1 wherein the upper and lower elements are composed of a generally translucent, plastic material, whereby a user may observe the position of the float valve within the closed chamber.

3. The flow regulator of claim 1 wherein the closed chamber contains a visualindicating flow means, whereby the length of the closed chamber may be adjusted in proportion to the flow rate desired in volume-per-unit time.

4. The flow regulator of claim 1 wherein the inlet and outlet are generally cylindrical openings, and upper and lower portions of the float valve are characterized by a tapered, conical shape, whereby the sealing relationship of the float valve within the closed chamber is through contact at the one end of the cylindrical inlet and outlet openings and the tapered conical shape of the upper and lower portions of the float valve, thereby inhibiting sticking of the float valve in operation of the flow regulator.

5. The flow regulator of claim 1 wherein the first and second upper and lower, generally cylindrical elements forming the closed container are threadably adjusted through the use of threads on the surface of the upper and lower elements.

6. A fluid-delivery system which comprises:
(a) a source of a gravity-fed liquid; and
(b) a means to introduce liquid from the gravity-fed source into the inlet of the fow regulator of claim 1.

7. In a method of providing a constant-flow regulation of a liquid from a gravity-assisted source, employing a flow regulator which comprises:
(a) a single closed chamber adapted to contain a liquid which is to be delivered at a controlled rate;
(b) a vent means in the upper portion of the chamber, having a communication between the atmosphere and the interior of the closed chamber;
(c) a centrally disposed inlet in the upper portion of the closed chamber and an opposite centrally disposed outlet in the lower portion of the closed chamber; and
(d) a float valve disposed within the closed chamber, said closed chamber having upper and lower sections that are so positioned to seal the float valve against the upper inlet and the lower outlet when the liquid from the gravity-assisted source is not being delivered to the closed chamber, the improvement which comprises:
adjusting the longitudinal length of the upper and lower sections of the closed chamber relative to each other, to allow movement of the float valve within the closed chamber to provide the desired flow rate of the liquid from the gravity-assisted source and to maintain a desired liquid level in the closed chamber, said float valve may seal the upper inlet when the liquid level in the closed chamber exceeds the desired liquid level and said float valve may seal the lower outlet when the liquid level in the closed chamber drops below the desired liquid level 8. The method of claim 7 which includes threadably adjusting the upper and lower elements forming the closed chamber, which threadable adjustment adjusts the longitudinal length of the chamber, to control the flow rate of the liquid from the gravity-assisted source.

9. The method of claim 7 which includes:
(a) providing a visual scale on the closed chamber; and
(b) adjusting the longitudinal length of the closed chamber in response to a reference point on the visual scale, to provide the desired control rate of the liquid.

10. In a flow-regulator device for use in a gravity-assisted fluid-delivery system, wherein the flow regulator comprises:

(a) a single closed chamber adapted to contain a liquid which is to be delivered at a controlled rate;
(b) a vent means in the upper portion of the closed chamber, having a communication between the atmosphere and the interior of the closed chamber;
(c) a centrally disposed inlet in the upper portion of the closed chamber and an opposite centrally disposed outlet in the lower portion of the closed chamber; and
(d) a float valve disposed within the closed chamber, said closed chamber having upper and lower sections that are so positioned to seal the float valve against the upper inlet and the lower outlet when the fluid from the gravity-assisted system is not being delivered to the closed chamber, the improvement which comprises
(i) the upper and lower sections of the closed chamber being formed by a first, upper, generally cylindrical element and a second, upper, generally similar cylindrical element, the upper and lower elements formed of a hard, translucent, plastic material, the upper and lower elements in a matingly engaged, movable, longitudinal relationship, to form a fluid-tight, closed chamber containing said float valve therein,
(ii) threadable means to adjust the longitudinal length of said closed chamber formed by the upper and lower elements, and
(iii) visual-indicating means on the surface of the closed chamber, to provide for adjustment in the length of the closed chamber in relation to the flow rate desired,
whereby, on movement of the upper and lower elements relative to each other, the flow rate of the liquid in the closed chamber may be controlled by the movement of the float valve, to maintain a desired liquid level in the closed chamber said float valve may seal the upper inlet when the liquid level in the closed chamber exceeds the desired liquid level and said float valve may seal the lower outlet when the liquid level in the closed chamber drops below the desired liquid level.

11. The flow regulator of claim 10 wherein the inlet and outlet are generally cylindrical openings, and upper and lower portions of the float valve are characterized by a tapered, conical shape, whereby the sealing relationship of the float valve within the closed chamber is through contact at the one end of the cylindrical inlet and outlet openings and the tapered, conical shape of the upper and lower portions of the float valve, thereby inhibiting sticking of the float valve in operation of the flow regulator.

* * * * *